(12) United States Patent
Kimori

(10) Patent No.: US 9,223,704 B2
(45) Date of Patent: Dec. 29, 2015

(54) MEMORY ACCESS CONTROL CIRCUIT, PREFETCH CIRCUIT, MEMORY DEVICE AND INFORMATION PROCESSING SYSTEM

(75) Inventor: Yoshitaka Kimori, Tokyo (JP)

(73) Assignee: Sony Corporation, Tokyo (JP)

( * ) Notice: Subject to any disclaimer, the term of this patent is extended or adjusted under 35 U.S.C. 154(b) by 231 days.

(21) Appl. No.: 13/328,467

(22) Filed: Dec. 16, 2011

(65) Prior Publication Data

US 2012/0191925 A1     Jul. 26, 2012

(30) Foreign Application Priority Data

Jan. 21, 2011    (JP) .................................. 2011-004221

(51) Int. Cl.
| | | |
|---|---|---|
| G06F 12/00 | (2006.01) | |
| G06F 13/00 | (2006.01) | |
| G06F 13/28 | (2006.01) | |
| G06F 12/08 | (2006.01) | |

(52) U.S. Cl.
CPC .... *G06F 12/0862* (2013.01); *G06F 2212/6022* (2013.01)

(58) Field of Classification Search
CPC ....................................................... G06F 9/383
USPC .......................................................... 711/137
See application file for complete search history.

(56) References Cited

U.S. PATENT DOCUMENTS

| | | | | |
|---|---|---|---|---|
| 4,926,323 A | * | 5/1990 | Baror et al. .................... | 712/238 |
| 5,497,466 A | * | 3/1996 | Roden et al. ................... | 710/305 |
| 5,828,853 A | * | 10/1998 | Regal ............................. | 710/315 |
| 6,405,280 B1 | * | 6/2002 | Ryan .............................. | 711/105 |
| 6,523,108 B1 | * | 2/2003 | James et al. ................... | 712/224 |
| 6,553,478 B1 | * | 4/2003 | Grossier ........................ | 711/209 |
| 6,795,899 B2 | * | 9/2004 | Dodd et al. .................... | 711/137 |
| 6,895,474 B2 | * | 5/2005 | Ryan et al. .................... | 711/137 |
| 6,895,475 B2 | * | 5/2005 | Volpe et al. ................... | 711/137 |
| 7,162,588 B2 | * | 1/2007 | van de Waerdt .............. | 711/137 |
| 7,334,116 B2 | * | 2/2008 | Iwata ............................. | 712/300 |
| 7,818,519 B2 | * | 10/2010 | Plunkett ........................ | 711/158 |
| 8,307,147 B2 | * | 11/2012 | Goren et al. .................. | 710/316 |
| 2002/0035715 A1 | * | 3/2002 | Hatakeyama ................ | 714/788 |
| 2002/0095552 A1 | * | 7/2002 | Kavipurapu .................. | 711/118 |

(Continued)

FOREIGN PATENT DOCUMENTS

JP    2006-155488 A    6/2006

OTHER PUBLICATIONS

The Cache Guide, Brian Renn, Dec. 12, 1998, retrieved from http://www.cs.umd.edu/class/fall2001/cmsc411/projects/ramguide/cache/cache.html on Nov. 11, 2013 (19 pages).*

(Continued)

*Primary Examiner* — Sanjiv Shah
*Assistant Examiner* — Daniel C Chappell
(74) *Attorney, Agent, or Firm* — Sony Corporation

(57) ABSTRACT

Disclosed herein is a memory access control circuit including: a determination section adapted to determine whether a target requested by a first wraparound memory access request from a processor is stored in a prefetch buffer; a request generation section adapted to generate a second wraparound memory access request including the target if it is determined that the target is not stored in the prefetch buffer; and an address conversion section adapted to convert the start address of the first wraparound memory access request according to predetermined rules for use as a start address of the second wraparound memory access request.

10 Claims, 11 Drawing Sheets

(56) References Cited

U.S. PATENT DOCUMENTS

| | | | |
|---|---|---|---|
| 2003/0182513 A1* | 9/2003 | Dodd et al. | 711/137 |
| 2003/0204674 A1* | 10/2003 | Ryan et al. | 711/137 |
| 2004/0039878 A1* | 2/2004 | van de Waerdt | 711/137 |
| 2004/0064649 A1* | 4/2004 | Volpe et al. | 711/137 |
| 2004/0260908 A1* | 12/2004 | Malik et al. | 711/213 |
| 2005/0138525 A1* | 6/2005 | Helbig | 714/766 |
| 2006/0004982 A1* | 1/2006 | Matheny | 711/202 |
| 2006/0117226 A1* | 6/2006 | Hirano | 714/43 |
| 2006/0271755 A1* | 11/2006 | Miura | 711/165 |
| 2009/0089540 A1* | 4/2009 | Hansen et al. | 712/29 |
| 2009/0313450 A1* | 12/2009 | Ikeda et al. | 711/170 |
| 2010/0312945 A1* | 12/2010 | Hutson | 711/5 |
| 2012/0042128 A1* | 2/2012 | Hosoda | 711/125 |
| 2013/0124790 A1* | 5/2013 | Miura | 711/103 |

OTHER PUBLICATIONS

"The IEEE Floating Point Format", Sep. 15, 2005, retrieved from http://people.sc.fsu.edu/~jburkardt/html/ieee.html on Jun. 7, 2013 (2 pages).*

Machine translation of JP 2006-155488, Hirano.*

* cited by examiner

FIG.3

| HBURST[2:0] | MEANING |
|---|---|
| 3'b000 | SINGLE |
| 3'b001 | INCR |
| 3'b010 | WRAP4 |
| 3'b011 | INCR4 |
| 3'b100 | WRAP8 |
| 3'b101 | INCR8 |
| 3'b110 | WRAP16 |
| 3'b111 | INCR16 |

FIG. 5A

PREFETCH (WRAP16): 0 1 2 3 4 5 6 7 8 9 10 11 12 13 14 15

PROCESSOR (WRAP4):
- 0 1 2 3 (+0)
- 1 2 3 0 (+1)
- 2 3 0 1 (+2)
- 3 0 1 2 (+3)

FIG. 5B

PREFETCH (WRAP16): 4 5 6 7 8 9 10 11 12 13 14 15 0 1 2 3

PROCESSOR (WRAP4):
- 4 5 6 7 (+0)
- 5 6 7 4 (+1)
- 6 7 4 5 (+2)
- 7 4 5 6 (+3)

FIG. 5C

PREFETCH (WRAP16): 8 9 10 11 12 13 14 15 0 1 2 3 4 5 6 7

PROCESSOR (WRAP4):
- 8 9 10 11 (+0)
- 9 10 11 8 (+1)
- 10 11 8 9 (+2)
- 11 8 9 10 (+3)

FIG. 5D

PREFETCH (WRAP16): 12 13 14 15 0 1 2 3 4 5 6 7 8 9 10 11

PROCESSOR (WRAP4):
- 12 13 14 15 (+0)
- 13 14 15 12 (+1)
- 14 15 12 13 (+2)
- 15 12 13 14 (+3)

FIG.6

| INPUT SIDE | | OUTPUT SIDE | | ADDITIONAL LATENCY |
|---|---|---|---|---|
| HBURST_I[2:0] | HADDR_I[5:2] | HBURST_O[2:0] | HADDR_O[5:2] | |
| WRAP4 | 4'b0000 | WRAP16 | 4'b0000 | +0 |
| WRAP4 | 4'b0001 | WRAP16 | 4'b0000 | +1 |
| WRAP4 | 4'b0010 | WRAP16 | 4'b0000 | +2 |
| WRAP4 | 4'b0011 | WRAP16 | 4'b0000 | +3 |
| WRAP4 | 4'b0100 | WRAP16 | 4'b0100 | +0 |
| WRAP4 | 4'b0101 | WRAP16 | 4'b0100 | +1 |
| WRAP4 | 4'b0110 | WRAP16 | 4'b0100 | +2 |
| WRAP4 | 4'b0111 | WRAP16 | 4'b0100 | +3 |
| WRAP4 | 4'b1000 | WRAP16 | 4'b1000 | +0 |
| WRAP4 | 4'b1001 | WRAP16 | 4'b1000 | +1 |
| WRAP4 | 4'b1010 | WRAP16 | 4'b1000 | +2 |
| WRAP4 | 4'b1011 | WRAP16 | 4'b1000 | +3 |
| WRAP4 | 4'b1100 | WRAP16 | 4'b1100 | +0 |
| WRAP4 | 4'b1101 | WRAP16 | 4'b1100 | +1 |
| WRAP4 | 4'b1110 | WRAP16 | 4'b1100 | +2 |
| WRAP4 | 4'b1111 | WRAP16 | 4'b1100 | +3 |

FIG.9

| INPUT SIDE | | OUTPUT SIDE | | ADDITIONAL LATENCY |
|---|---|---|---|---|
| HBURST_I[2:0] | HADDR_I[5:2] | HBURST_O[2:0] | HADDR_O[5:2] | |
| WRAP4 | 4'b0000 | WRAP8 | 4'b0000 | +0 |
| | 4'b0001 | | | +1 |
| | 4'b0010 | | | +2 |
| | 4'b0011 | | | +3 |
| WRAP4 | 4'b0100 | WRAP8 | 4'b0100 | +0 |
| | 4'b0101 | | | +1 |
| | 4'b0110 | | | +2 |
| | 4'b0111 | | | +3 |
| WRAP4 | 4'b1000 | WRAP8 | 4'b1000 | +0 |
| | 4'b1001 | | | +1 |
| | 4'b1010 | | | +2 |
| | 4'b1011 | | | +3 |
| WRAP4 | 4'b1100 | WRAP8 | 4'b1100 | +0 |
| | 4'b1101 | | | +1 |
| | 4'b1110 | | | +2 |
| | 4'b1111 | | | +3 |

FIG.11

| INPUT SIDE | | OUTPUT SIDE | | ADDITIONAL LATENCY |
|---|---|---|---|---|
| HBURST_I [2:0] | HADDR_I [5:2] | HBURST_O[2:0] | HADDR_O[5:2] | |
| WRAP8 | 4'b0000 | WRAP16 | 4'b0000 | +0 |
| | 4'b0001 | | | +1 |
| | 4'b0010 | | | +2 |
| | 4'b0011 | | | +3 |
| | 4'b0100 | | | +4 |
| | 4'b0101 | | | +5 |
| | 4'b0110 | | | +6 |
| | 4'b0111 | | | +7 |
| WRAP8 | 4'b1000 | WRAP16 | 4'b1000 | +0 |
| | 4'b1001 | | | +1 |
| | 4'b1010 | | | +2 |
| | 4'b1011 | | | +3 |
| | 4'b1100 | | | +4 |
| | 4'b1101 | | | +5 |
| | 4'b1110 | | | +6 |
| | 4'b1111 | | | +7 |

MEMORY ACCESS CONTROL CIRCUIT, PREFETCH CIRCUIT, MEMORY DEVICE AND INFORMATION PROCESSING SYSTEM

BACKGROUND

The present disclosure relates to a memory access control circuit, and more particularly, to a memory access control circuit, prefetch circuit, memory device and information processing system for gaining burst access to a memory.

A processor uses a memory both as an instruction storage area and as a data storage area. Therefore, it is necessary for the processor to access the memory highly frequently during the execution of a program. In order to reduce the burden on the memory resulting from such frequent accesses, a cache memory is provided between the processor and memory. A cache memory manages a plurality of continuous words as a line. Therefore, the plurality of words are filled altogether at the time of a cache mishit. At this time, a burst transfer is used to transfer data from the memory.

In order to achieve transfer of a plurality of words using a burst transfer, a system is known which can change the sequence of the words to be transferred by using the wraparound function adapted to wrap around the addresses in a specific range. For example, a data processor has been proposed which allows different types of burst transfer such as four-burst wrap (WRAP4), eight-burst wrap (WRAP8) and 16-burst wrap (WRAP16) to be specified (refer, for example, to Japanese Patent Laid-Open No. 2006-155488).

SUMMARY

As the memory becomes increasingly layered, a prefetch buffer may be provided between the cache memory and memory. In this case, the size in which the prefetch buffer is managed is likely larger than the line size of the cache memory, thus resulting in a larger burst transfer size. For example, if the processor requests a four-burst wrap, it is likely that the prefetch buffer may request a 16-burst wrap to the memory. If the wraparound function is used in this case, and if the start address is the third word as illustrated in FIG. 7A, the remaining zeroth to second words are not transferred quickly, thus causing the processor to stall.

The present disclosure has been made in light of the foregoing, and it is desirable, when generating a wraparound memory access request, different in size from the original, to perform start address conversion so as to reduce the processor stall cycles.

According to a first mode of the present disclosure, there are provided a memory access control circuit, prefetch buffer, memory device and information processing system. Each of the memory access control circuit, memory device and information processing system includes a determination section, request generation section and address conversion section. The determination section determines whether a target requested by a first wraparound memory access request from a processor is stored in the prefetch buffer. The request generation section generates a second wraparound memory access request including the target if it is determined that the target is not stored in the prefetch buffer. The address conversion section converts the start address of the first wraparound memory access request according to predetermined rules for use as a start address of the second wraparound memory access request. This speeds up the time it takes to complete the response to the first wraparound memory access request, thus providing reduced processor stall cycles.

Further, in the first mode, the address conversion section may achieve the address conversion by replacing a lower bit portion of the unit of burst of the start address of the first wraparound memory access request with a predetermined value. In this case, the address conversion section may achieve the address conversion by replacing, of the start address of the first wraparound memory access request, the lower bit portion appropriate in length to the wraparound size of the first wraparound memory access request with the predetermined value. Further, the address conversion section may achieve the address conversion by replacing the lower bit portion of the start address of the first wraparound memory access request with zeros.

In particular, if the first wraparound memory access request is intended to request a four-burst wraparound, and if the second wraparound memory access request is intended to request a 16-burst wraparound, the address conversion section may achieve the address conversion by replacing the lower two bits of the unit of burst of the start address of the first wraparound memory access request with zeros.

Further, if the first wraparound memory access request is intended to request a four-burst wraparound, and if the second wraparound memory access request is intended to request an eight-burst wraparound, the address conversion section may achieve the address conversion by replacing the lower two bits of the unit of burst of the start address of the first wraparound memory access request with zeros.

Still further, if the first wraparound memory access request is intended to request an eight-burst wraparound, and if the second wraparound memory access request is intended to request a 16-burst wraparound, the address conversion section may achieve the address conversion by replacing the lower three bits of the unit of burst of the start address of the first wraparound memory access request with zeros.

The present disclosure performs start address conversion when generating a wraparound memory access request, different in size from the original, thus providing reduced processor stall cycles.

BRIEF DESCRIPTION OF THE DRAWINGS

FIG. 3 is a diagram illustrating the content of an HBURST [2:0] signal;

FIGS. 5A to 5D are diagrams illustrating the correspondence between wraparound memory access requests in a first embodiment of the present disclosure;

FIG. 6 is a diagram illustrating the rules for converting a wraparound memory access request in the first embodiment of the present disclosure;

FIG. 9 is a diagram illustrating the rules for converting a wraparound memory access request in the second embodiment of the present disclosure;

FIG. 11 is a diagram illustrating the rules for converting a wraparound memory access request in the third embodiment of the present disclosure.

DETAILED DESCRIPTION OF THE PREFERRED EMBODIMENTS

A description will be given below of the modes for carrying out the present disclosure (hereinafter referred to as the embodiments). The description will be given in the following order.
1. First embodiment (example in which WRAP16 is generated from WRAP4)
2. Second embodiment (example in which WRAP8 is generated from WRAP4)
3. Third embodiment (example in which WRAP16 is generated from WRAP8)

<1. First Embodiment>
[Configuration of the Information Processing System]

Figure 1:
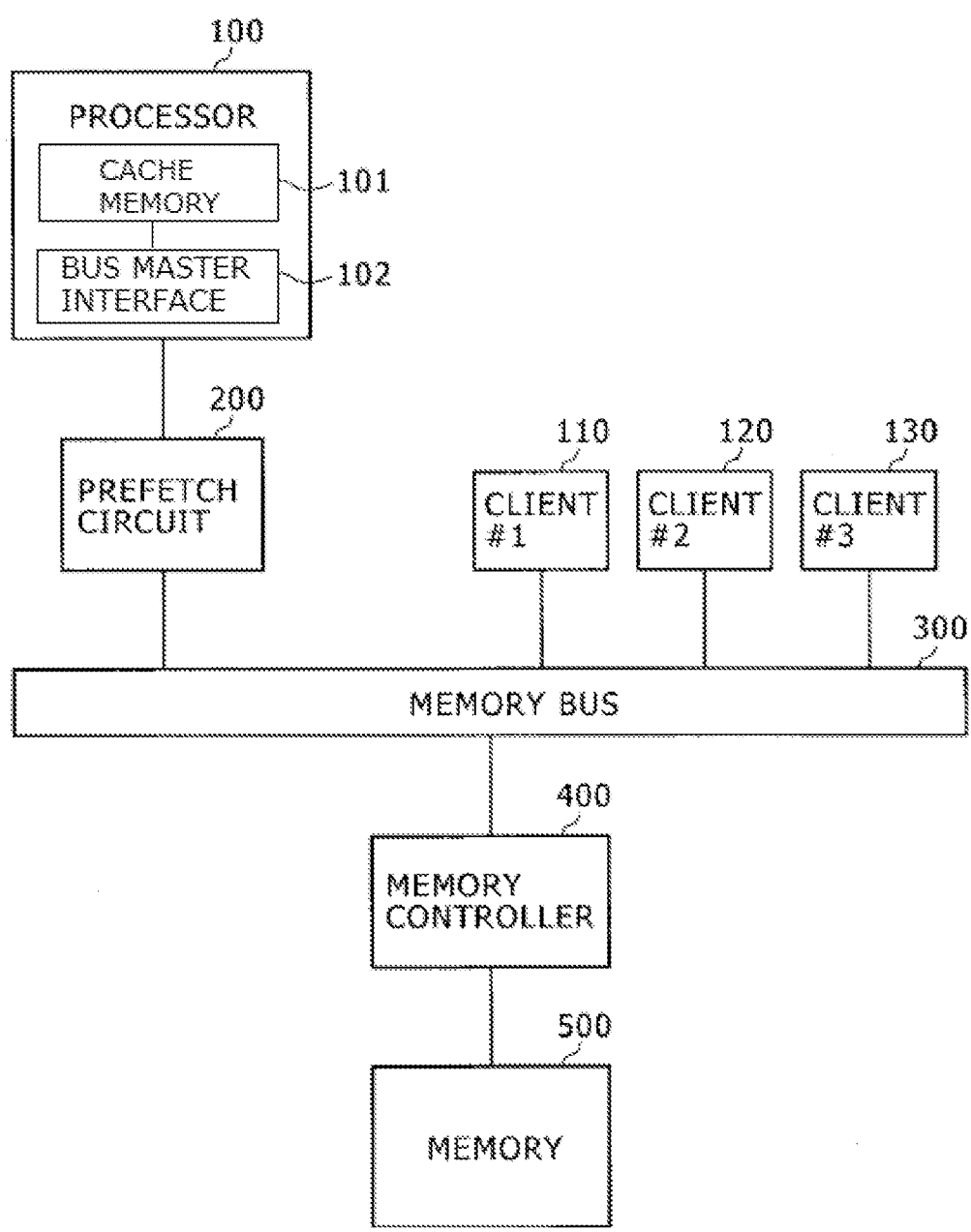
FIG. 1 is a diagram illustrating a configuration example of an information processing system according to embodiments of the present disclosure.

FIG. 1 is a diagram illustrating a configuration example of an information processing system according to embodiments of the present disclosure. This information processing system includes a processor 100, clients 110 to 130, a prefetch circuit 200, a memory bus 300, a memory controller 400 and a memory 500.

The processor 100 executes a process according to the instructions of a program. The instructions of the program are stored in an instruction storage area of the memory 500. On the other hand, data necessary for the process is stored in a data storage area of the memory 500. Part of the copy of the contents of the instruction storage area and data storage area is stored in the prefetch circuit 200. Further, the processor 100 incorporates a cash memory 101 and part of the copy of the contents of the instruction storage area and data storage area in the memory 500 is stored therein. Further, the processor 100 incorporates a bus master interface 102 to exchange data with the memory bus 300.

The prefetch circuit 200 prefetches and stores part of the copy of the contents of the instruction storage area and data storage area. As described later, the prefetch circuit 200 converts the size and start address of a wraparound memory access request from the processor 100 and outputs the converted size and start address to the memory bus 300.

The memory bus 300 connects together the prefetch circuit 200 connected to the processor 100, the clients 110 to 130 other than the processor 100, and the memory controller 400. We assume here that a unified memory system is used. However, the present disclosure is not limited thereto.

The memory controller 400 controls access to the memory 500. The memory 500 is shared among the processor 100 and other clients 110 to 130.

[Bus Master Interface]

Figure 2:
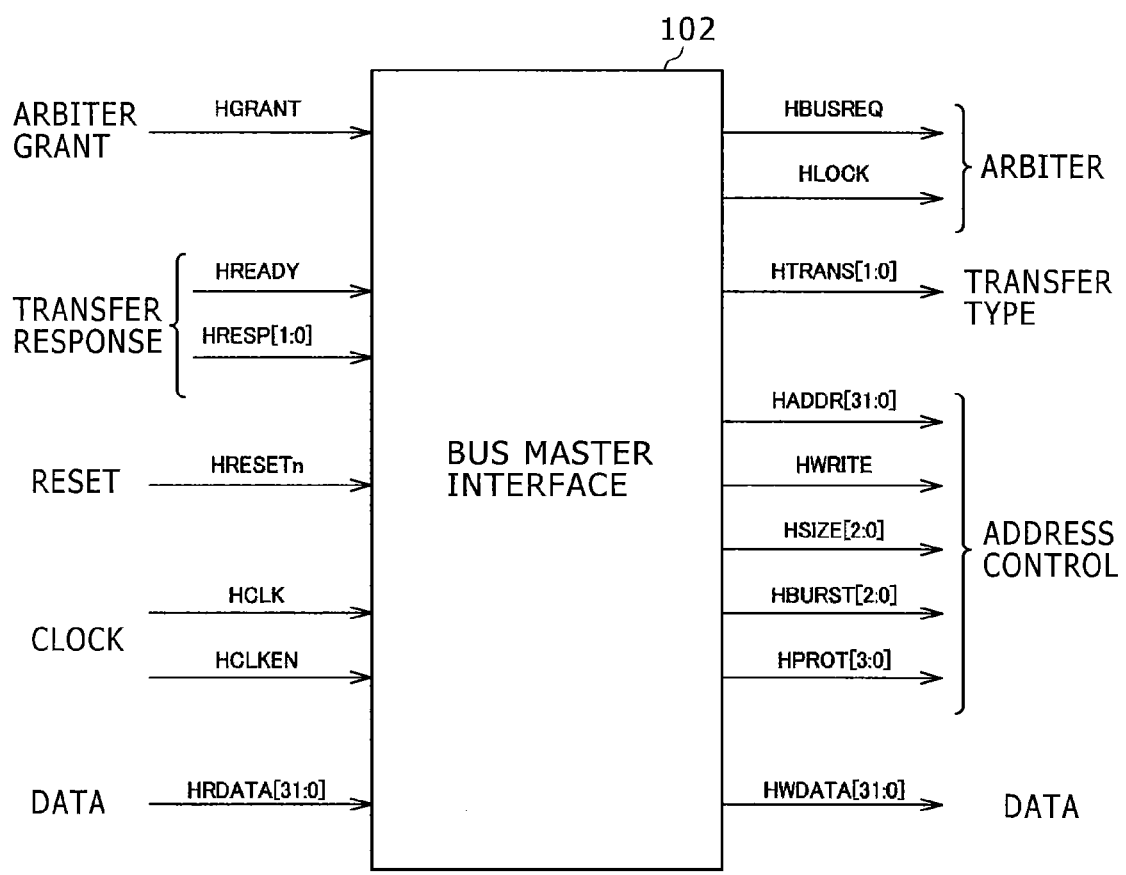
FIG. 2 is a diagram illustrating a configuration example of a bus master interface according to the embodiments of the present disclosure.

FIG. 2 is a diagram illustrating a configuration example of the bus master interface 102 according to the embodiments of the present disclosure. The bus master interface 102 is compliant with the AHB (Advanced High-performance Bus) bus master interface from ARM Ltd. However, the present disclosure is not limited thereto and is applicable to other types of buses adapted to gain wraparound memory access such as the AXI (Advanced eXtensible Interface) bus and OCP (Open Core Protocol) bus.

An HGRANT signal indicates that the bus transfer is granted by the arbiter. An HREADY signal indicates that the current transfer is complete. An HRESP[1:0] signal indicates the transfer status. An HRESETn signal is used to perform a global reset. It should be noted that "n" at the end of the signal indicates that the signal is low active.

An HCLK signal is a bus clock input signal. An HCLKEN signal is a bus clock enable signal. An HRDATA[31:0] signal is a read data input signal from the memory 500.

An HBUSREQ signal is used to request bus transfer to the arbiter. An HLOCK signal indicates that the access is locked. An HTRANS[1:0] signal indicates the current transfer type.

An HADDR[31:0] signal is an address signal adapted to output a read or write address to the memory 500. In the case of burst transfer, this address signal indicates a start address. An HWRITE signal indicates whether the current direction of transfer is the write or read direction. An HSIZE[2:0] signal indicates the current transfer size. An HBURST[2:0] signal indicates the current transfer burst length. An HPROT[3:0] signal is a protection control signal. An HWDATA[31:0] signal is a write data output signal to the memory 500.

FIG. 3 is a diagram illustrating the content of the HBURST [2:0] signal. If the HBURST[2:0] signal indicates "3'b000," this means single transfer (SINGLE). It should be noted that "n'b0 - - - 0" represents an n-digit (three-digit in this case) bit sequence. If the HBURST[2:0] signal indicates "3'b001," this means incremental burst transfer (INCR) with no length specification. In incremental burst transfer, a fixed value is added to the address of each burst transferred. If the HBURST [2:0] signal indicates "3'b010," this means four-burst wraparound burst transfer (WRAP4). A wraparound burst transfer is designed to allow the address in a specific range to be added and wrap around the wrap boundary. Here, the term "wraparound memory access" is treated as having the same meaning as the term "wraparound burst transfer."

If the HBURST[2:0] signal indicates "3'b011," this means four-burst incremental burst transfer (INCR4). If the HBURST[2:0] signal indicates "3'b100," this means eight-burst wraparound burst transfer (WRAP8). If the HBURST [2:0] signal indicates "3'b101," this means eight-burst incremental burst transfer (INCR8). If the HBURST[2:0] signal indicates "3'b110," this means 16-burst wraparound burst transfer (WRAP16). If the HBURST[2:0] signal indicates "3'b111," this means 16-burst incremental burst transfer (INCR16).

[Configuration of the Prefetch Circuit]

Figure 4:
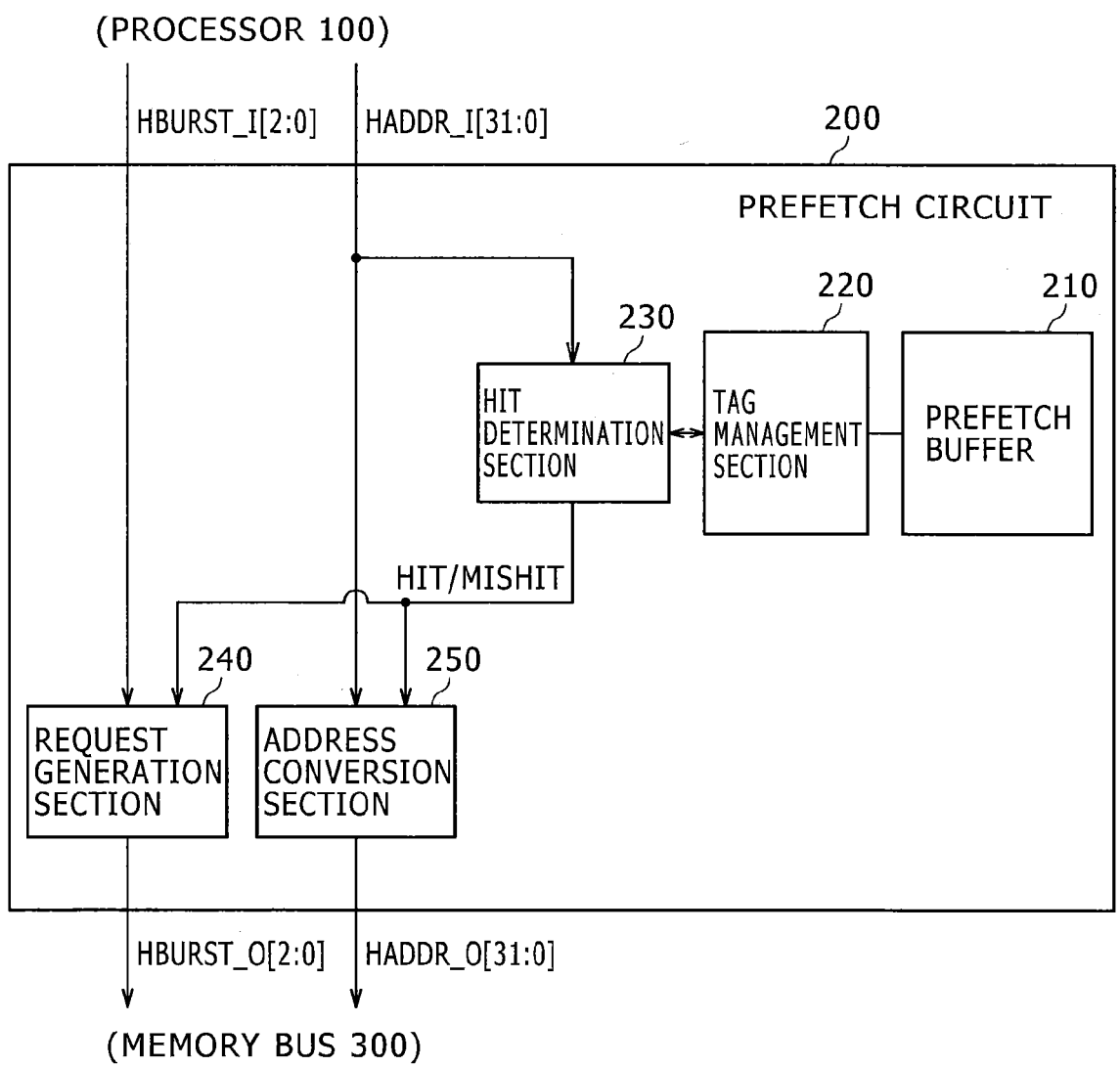
FIG. 4 is a diagram illustrating a configuration example of a prefetch circuit in the embodiments of the present disclosure.

FIG. 4 is a diagram illustrating a configuration example of the prefetch circuit 200 in the embodiments of the present disclosure. The prefetch circuit 200 includes a prefetch buffer 210, a tag management section 220, a hit determination section 230, a request generation section 240 and an address conversion section 250.

The prefetch buffer 210 stores part of the copy of the contents of the instruction storage area and data storage area of the memory 500 that are provided for the processor 100. We assume that the size in which the prefetch buffer 210 is managed is larger than the line size of the cache memory 101 of the processor 100.

The tag management section 220 manages the address tags of the targets (instructions or data) stored in the prefetch buffer 210. Some of a plurality of higher bits of the target address field is used as a tag.

The hit determination section 230 determines whether a memory access from the processor 100 hits the prefetch buffer 210. That is, the prefetch buffer 210 is hit when the target (instruction or data) of a memory access from the processor 100 is stored in the prefetch buffer 210, and the prefetch buffer 210 is mishit if the target is not stored therein. The hit determination section 230 determines whether the prefetch buffer 210 is hit by referencing the HADDR_I[31:0] signal from the processor 100.

The request generation section 240 generates a memory access request to the memory 500 in accordance with a memory access request from the processor 100. If the hit determination section 230 determines that the prefetch buffer 210 is mishit, the request generation section 240 generates an HBURST_O[2:0] signal representing a new burst type based on an HBURST_I[2:0] signal representing the burst type from the processor 100. In this first embodiment, if the HBURST_I[2:0] signal indicates "WRAP4," "WRAP16" is output as the HBURST_O[2:0] signal.

The address conversion section 250 converts the burst transfer start address of a wraparound memory access request from the processor 100. If the hit determination section 230 determines that the prefetch buffer 210 is mishit, the address conversion section 250 converts an HADDR_I[31:0] signal representing the start address from the processor 100 according to predetermined rules, thus generating an HADDR_O[31:0] signal representing a new start address. As a specific example of address conversion, a lower bit portion of the unit of burst of the start address of the HADDR_I[31:0] signal may be replaced with a predetermined value (e.g., zeros). The lower bit portion is appropriate in length to the wraparound size of the wraparound memory access request. In the first embodiment, the wraparound size from the processor 100 is four bursts. Therefore, the lower two bits (HADDR_I[3:2]) of the unit of burst of the start address of the HADDR_I[31:0] signal are replaced with zeros. As will be described later, if the wraparound size from the processor 100 is eight bursts, the lower three bits (HADDR_I[4:2]) of the unit of burst of the start address of the HADDR_I[31:0] signal are replaced with zeros. That is, if the wraparound size from the processor 100 is 2" bursts, the lower m bits (HADDR_I[(m+1):2]) of the unit of burst of the start address of the HADDR_I[31:0] signal are replaced with zeros. It should be noted that, for the portion other than the replaced one, the value of the HADDR_I[31:0] signal is used in an "as-is" manner, thus generating the HADDR_O[31:0] signal.

[Response Timing to the Wraparound Memory Access Request]

FIGS. 5A to 5D are diagrams illustrating the correspondence between wraparound memory access requests in the first embodiment of the present disclosure. This first embodiment illustrates an example in which the wraparound memory access request from the processor 100 is a WRAP4, and the wraparound memory access request from the prefetch circuit 200 is a WRAP16.

FIG. 5A illustrates the correspondence when the start address of the wraparound memory access request from the processor 100 is one of "0" to "3." In this case, it is possible to complete a four-burst transfer with an additional latency of one of "+0" to "+3" by fixing the start address of the response to the prefetch circuit 200 to "0."

FIG. 5B illustrates the correspondence when the start address of the wraparound memory access request from the processor 100 is one of "4" to "7." In this case, it is possible to complete a four-burst transfer with an additional latency of one of "+0" to "+3" by fixing the start address of the response to the prefetch circuit 200 to "4."

FIG. 5C illustrates the correspondence when the start address of the wraparound memory access request from the processor 100 is one of "8" to "11." In this case, it is possible to complete a four-burst transfer with an additional latency of one of "+0" to "+3" by fixing the start address of the response to the prefetch circuit 200 to "8."

FIG. 5D illustrates the correspondence when the start address of the wraparound memory access request from the processor 100 is one of "12" to "15." In this case, it is possible to complete a four-burst transfer with an additional latency of one of "+0" to "+3" by fixing the start address of the response to the prefetch circuit 200 to "12."

FIG. 6 is a diagram illustrating rules for converting a wraparound memory access request in the first embodiment of the present disclosure. That is, if an HBURST_I[2:0] signal representing the burst type from the processor 100 indicates "WRAP4," an HBURST_O[2:0] signal representing a new burst type indicates "WRAP16." Further, the lower two bits (HADDR_I[3:2]) of the unit of burst of the HADDR_I[31:0] signal representing the start address from the processor 100 are replaced with zeros, thus generating the HADDR_O[31:0] signal.

In this case, the additional latency is one of "+0" to "+3." Therefore, an additional latency is only three cycles long even in the worst possible case. In contrast, if the start address of the wraparound memory access request from the processor 100 is used in an "as-is" manner, a stall period of up to 12 cycles may occur.

Figure 7A:
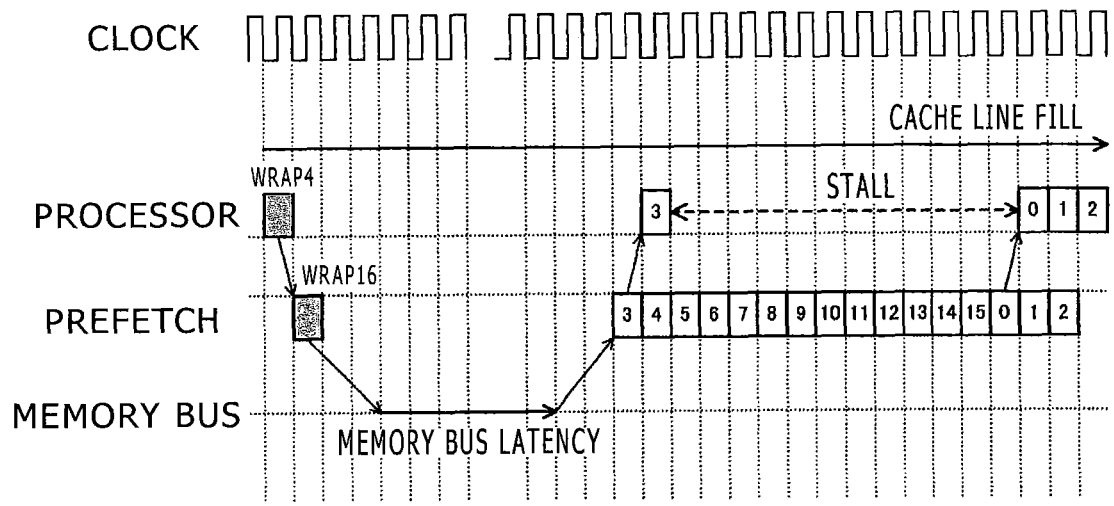
FIGS. 7A and 7B are diagrams illustrating an example of timing of wraparound memory access requests in the first embodiment of the present disclosure.
Figure 7B:
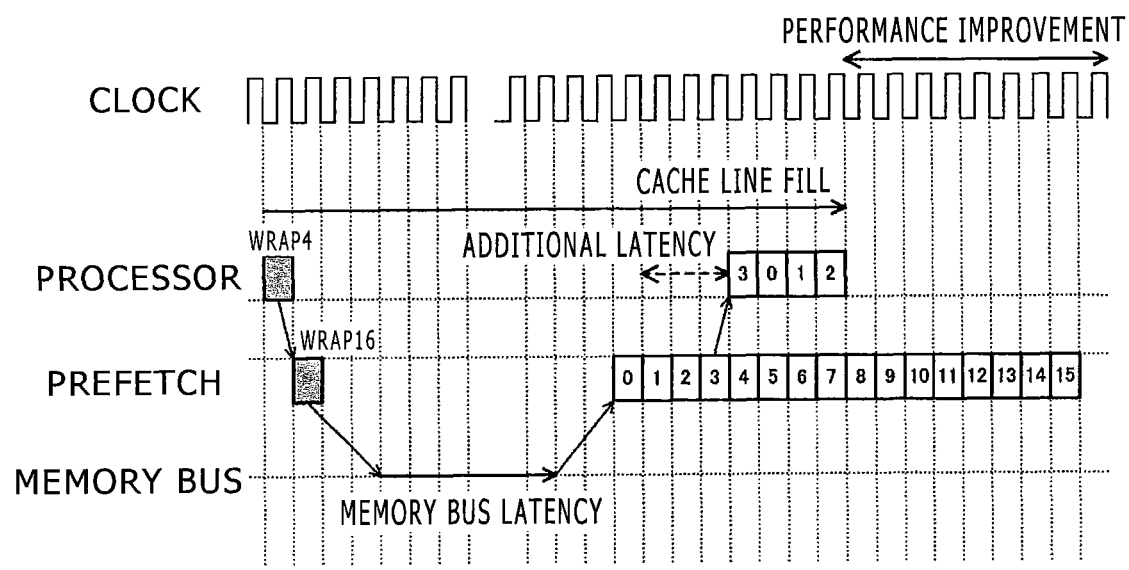

FIGS. 7A and 7B are diagrams illustrating an example of timing of wraparound memory access requests in the first embodiment of the present disclosure. Here, the burst type from the processor 100 is "WRAP4," and the burst type from the prefetch circuit 200 is "WRAP16." Further, the start address of the wraparound memory access request from the processor 100 is "3."

FIG. 7A illustrates a timing assuming that the start address of the wraparound memory access request from the processor 100 is output in an "as-is" manner to the memory 500. In this case, a burst "3" can be quickly received. However, a latency occurs before bursts "0" and onward are received, thus resulting in a stall period of 12 cycles of the processor 100.

For this reason, the burst transfer is completed earlier by fixing the start address of the wraparound memory access request from the prefetch circuit 200 to "0" as illustrated in FIG. 7B. In this case, an additional latency of three cycles occurs before the burst "3" is received. However, the bursts "0" and onward are already available. Therefore, it is possible to complete a burst transfer with no further latency. That is, it is clear that this example provides nine-cycle performance improvement.

As described above, the first embodiment of the present disclosure replaces the lower two bits of the unit of burst of the start address with zeros when generating a WRAP16 from a WRAP4, thus providing reduced processor stall cycles.

2. Second Embodiment

A description will be given in this second embodiment of an example in which the wraparound memory access request from the processor 100 is a WRAP4, and the wraparound memory access request from the prefetch circuit 200 is a WRAP8. The information processing system is identical in configuration to that in the first embodiment.

[Response Timing to the Wraparound Memory Access Request]

FIGS. 8A to 8D are diagrams illustrating the correspondence between wraparound memory access requests in the second embodiment of the present disclosure. The second embodiment is identical to the first embodiment except that the wraparound memory access request from the prefetch circuit 200 is a WRAP8.

Figure 8A:
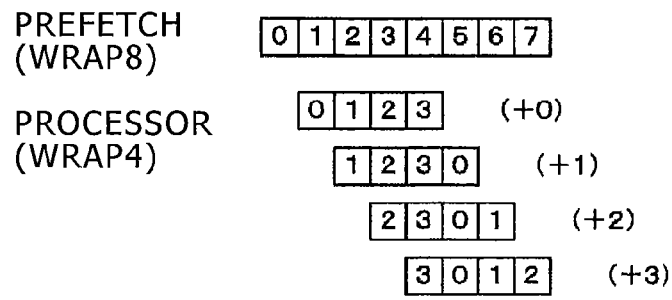
FIGS. 8A to 8D are diagrams illustrating the correspondence between wraparound memory access requests in a second embodiment of the present disclosure.

FIG. 8A illustrates the correspondence when the start address of the wraparound memory access request from the processor 100 is one of "0" to "3." In this case, it is possible to complete a four-burst transfer with an additional latency of one of "+0" to "+3" by fixing the start address of the response to the prefetch circuit 200 to "0."

Figure 8B:
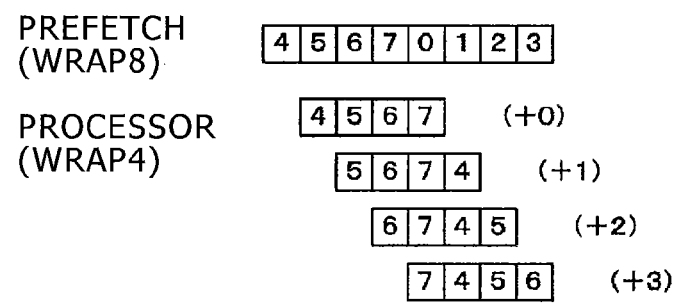

FIG. 8B illustrates the correspondence when the start address of the wraparound memory access request from the processor 100 is one of "4" to "7." In this case, it is possible to complete a four-burst transfer with an additional latency of one of "+0" to "+3" by fixing the start address of the response to the prefetch circuit 200 to "4."

Figure 8C:
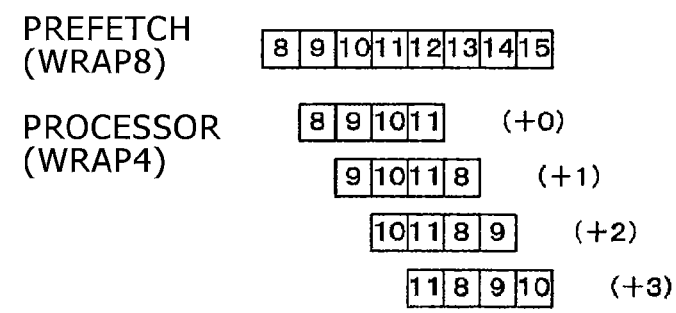

FIG. 8C illustrates the correspondence when the start address of the wraparound memory access request from the processor 100 is one of "8" to "11." In this case, it is possible to complete a four-burst transfer with an additional latency of one of "+0" to "+3" by fixing the start address of the response to the prefetch circuit 200 to "8."

Figure 8D:
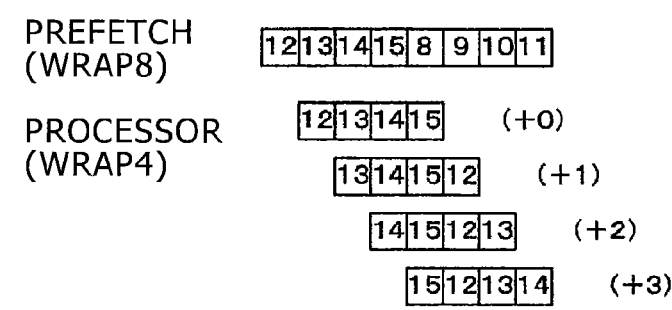

FIG. 8D illustrates the correspondence when the start address of the wraparound memory access request from the processor 100 is one of "12" to "15." In this case, it is possible to complete a four-burst transfer with an additional latency of one of "+0" to "+3" by fixing the start address of the response to the prefetch circuit 200 to "12."

FIG. 9 is a diagram illustrating the rules for converting a wraparound memory access request in the second embodiment of the present disclosure. That is, if the HBURST_I[2:0] signal representing the burst type from the processor 100 indicates "WRAP4," the HBURST_O[2:0] signal representing a new burst type indicates "WRAP8." Further, the lower two bits (HADDR_I[3:2]) of the unit of burst of the HADDR_I[31:0] signal representing the start address from the processor 100 are replaced with zeros, thus generating the HADDR_O[31:0] signal.

In this case, the additional latency is one of "+0" to "+3" as in the first embodiment. Therefore, an additional latency is only three cycles long even in the worst possible case. In contrast, if the start address of the wraparound memory access request from the processor 100 is used in an "as-is" manner, a latency of up to four cycles may occur.

As described above, the second embodiment of the present disclosure replaces the lower two bits of the unit of burst of the start address with zeros when generating a WRAP8 from a WRAP4, thus providing reduced processor stall cycles.

3. Third Embodiment

A description will be given in this third embodiment of an example in which the wraparound memory access request from the processor 100 is a WRAP8, and the wraparound memory access request from the prefetch circuit 200 is a WRAP16. The information processing system is identical in configuration to that in the first embodiment.

[Response Timing to the Wraparound Memory Access Request]

Figure 10A:
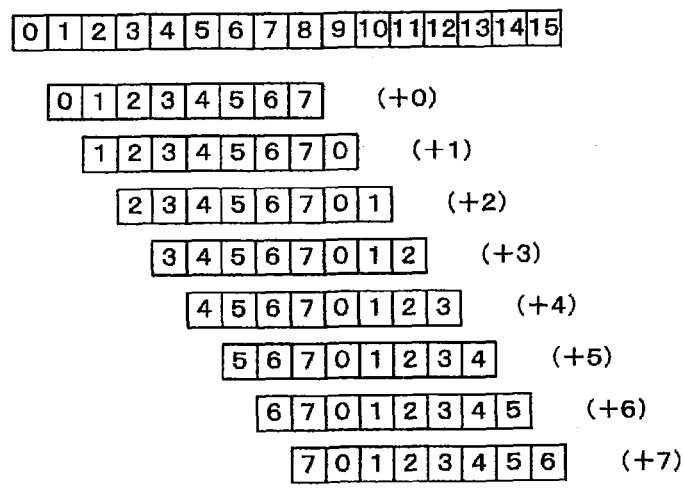
FIGS. 10A and 10B are diagrams illustrating the correspondence between wraparound memory access requests in a third embodiment of the present disclosure.
Figure 10B:
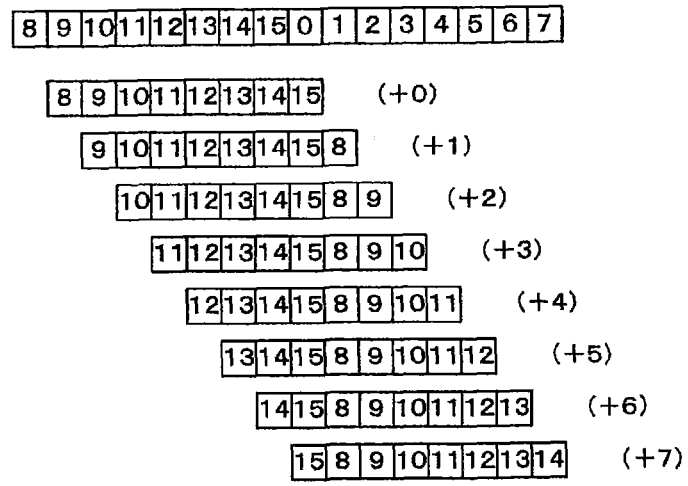

FIGS. 10A and 10B are diagrams illustrating the correspondence between wraparound memory access requests in the third embodiment of the present disclosure.

FIG. 10A illustrates the correspondence when the start address of the wraparound memory access request from the processor 100 is one of "0" to "7." In this case, it is possible to complete an eight-burst transfer with an additional latency of one of "+0" to "+7" by fixing the start address of the response to the prefetch circuit 200 to "0."

FIG. 10B illustrates the correspondence when the start address of the wraparound memory access request from the processor 100 is one of "8" to "15." In this case, it is possible to complete an eight-burst transfer with an additional latency of one of "+0" to "+7" by fixing the start address of the response to the prefetch circuit 200 to "8."

FIG. 11 is a diagram illustrating the rules for converting a wraparound memory access request in the third embodiment of the present disclosure. That is, if the HBURST_I[2:0] signal representing the burst type from the processor 100 indicates "WRAP8," the HBURST_O[2:0] signal representing a new burst type indicates "WRAP16." Further, the lower three bits (HADDR_I[4:2]) of the unit of burst of the HADDR_I[31:0] signal representing the start address from the processor 100 are replaced with zeros, thus generating the HADDR_O[31:0] signal.

In this case, the additional latency is one of "+0" to "+7." Therefore, an additional latency is only seven cycles long even in the worst possible case. In contrast, if the start address of the wraparound memory access request from the processor 100 is used in an "as-is" manner, a latency of up to 12 cycles may occur.

As described above, the third embodiment of the present disclosure replaces the lower three bits of the unit of burst of the start address with zeros when generating a WRAP16 from a WRAP8, thus providing reduced processor stall cycles.

It should be noted that although a bus master interface compliant with the AHB bus master interface has been taken as an example in the embodiments of the present disclosure, the present disclosure is not limited thereto. The present disclosure is also applicable to other types of buses adapted to gain wraparound memory access such as the AXI bus and OCP bus.

It should be noted that the embodiments of the present disclosure are merely examples for embodying the present disclosure. As has been explicitly pointed out in the embodiments of the present disclosure, there are correspondences between the features of the embodiments of the present disclosure and the specific features of the disclosure set forth in the claims. Similarly, there are correspondences between the specific features of the disclosure set forth in the claims and the identically named features of the embodiments of the present disclosure. It should be noted, however, that the present disclosure is not limited to the embodiments but may be embodied by modifying the embodiments in various manners without departing from the scope of the present disclosure.

The present application contains subject matter related to that disclosed in Japanese Priority Patent Application JP 2011-004221 filed in the Japan Patent Office on Jan. 12, 2011, the entire content of which is hereby incorporated by reference.

What is claimed is:

1. A memory access control circuit comprising:
one or more processors operable to:
determine whether a target, requested by a first wraparound memory access request by the one or more processors to a memory, is stored in a prefetch buffer;
generate a second wraparaound memory access request, by the prefetch buffer to the memory, including the target based on determining that the target is not stored in the prefetch buffer;
and covert a start address of the first wraparound memory access request for use as a start address of the second wraparound memory access request in an event a wraparound size of the first wraparound memory access request by the one or more processors is different from a wraparound size of the second wraparound memory access request by the prefetch buffer;
wherein the wraparound size of the one or more processors is $2^m$ bursts, and m bits starting from the least significant bit of the start address of the first wraparound memory access request are replaced with zeroes to generate the start address of the second wraparound memory access request, wherein a value of m is based on the wraparound size of the first memory access request.

2. The memory access control circuit of claim 1, wherein if the first wraparound memory access request is intended to request a four-burst wraparound, and if the second wraparound memory access request is intended to request a sixteen-burst wraparound, the one or more processors are operable to convert the start address of the first wraparound memory access request by replacing the lower two bits of the unit of burst of the start address of the first wraparound memory access request with zeroes.

3. The memory access control circuit of claim 1, wherein if the first wraparound memory access request is to request a four-burst wraparound, and if the second wraparound memory access request is to request an eight-burst wraparound, the one or more processors are operable to convert the start address of the first wraparound memory access request by replacing the lower two bits of the unit of burst of the start address of the first wraparound memory access request with zeroes.

4. The memory access control circuit of claim 1, wherein if the first wraparound memory access request is to request an eight-burst wraparound, and if the second wraparound memory access request is to request a sixteen-burst wraparound, the one or more processors are operable to convert the start address of the first wraparound memory access request by replacing the lower three bits of the unit of burst of the start address of the first wraparound memory access request with zeroes.

5. A prefetch circuit comprising:
a prefetch buffer; and
one or more processors operable to:
   determine whether a target, requested by a first wraparound memory access request by the one or more processors to a memory, is stored in the prefetch buffer;
   generate a second wraparound memory access request, by the prefetch buffer to the memory, including the target based on determining that the target is not stored in the prefetch buffer; and
   convert a start address of the first wraparound memory access request according to predetermined ruled for use as a start address of the second wraparound memory access request in an event a wraparound size of the first wraparound memory access request by the one or more processors is different from a wraparound size of the second wraparound memory access request by the prefetch buffer,
   wherein the wraparound size of the one or more processors is $2^m$ bursts, and m bits starting from the least significant bit of the start address of the first wraparound memory access request are replaced with zeroes to generate the start address of the second wraparound memory access request, wherein a value of m is based on the wraparound size of the first memory access request.

6. A memory device comprising:
a memory;
a prefetch buffer adapted to store a copy of a part of the memory; and
one or more processors operable to:
   determine whether a target, requested by a first wraparound memory access request by the one or more processors to the memory, is stored in the prefetch buffer;
   generate a second wraparound memory access request, by the prefetch buffer to the memory, including the target to the memory based on determining that the target is not stored in the prefetch buffer; and
   convert the start address of the first wraparound memory access request according to predetermined rules for use as a start address of the second wraparound memory access request in an event a wraparound size of the first wraparound memory access request by the one or more processors is different from a wraparound size of the second wraparound memory access request by the prefetch buffer,
   wherein the wraparound size of the one or more processors is $2^m$ bursts, and m bits starting from the least significant bit of the start address of the first wraparound memory access request are replaced with zeroes to generate the start address of the second wraparound memory access request, wherein a value of m is based on the wraparound size of the first memory access request.

7. An information processing system comprising:
a memory;
a prefetch buffer adapted to store a copy of part of the memory;
one or more processors operable to:
   determine whether a target, requested by a first wraparound memory access request by the one or more processors to the memory, is stored in the prefetch buffer;
   generate a second wraparound memory access request, by the prefetch buffer to the memory, including the target to the memory based on determining that the target is not stored in the prefetch buffer; and
   convert a start address of the first wraparound memory access request for use as a start address of the second wraparound memory access request in an event a wraparound size of the first wraparound memory access request by the one or more processors is different from a wraparound size of the second wraparound memory access request by the prefetch buffer,
   wherein the wraparound size of the one or more processors is $2^m$ bursts, and m bits starting from the least significant bit of the start address of the first wraparound memory access request are replaced with zeroes to generate the start address of the second wraparound memory access request, wherein a value of m is based on the wraparound size of the first memory access request.

8. The memory access circuit of claim 1, wherein the one or more processors are operable to manage address tags of targets stored in the prefetch buffer.

9. The memory access circuit of claim 1, wherein the one or more processors are operable to determine whether the target of a memory access request is stored in the prefetch buffer.

10. The memory access circuit of claim 1, wherein the conversion is based on a transfer burst length for the second wraparound memory access request, the transfer burst length being based on a previous transfer burst length for the first wraparound memory access request.

* * * * *